(12) United States Patent
Silver et al.

(10) Patent No.: US 6,754,325 B1
(45) Date of Patent: Jun. 22, 2004

(54) CALLER CONTROL OF CALL FORWARDING SERVICES

(75) Inventors: Edward M. Silver, Atlanta, GA (US); Linda A. Roberts, Decatur, GA (US); Hong T. Nguyen, Atlanta, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 110 days.

(21) Appl. No.: 10/113,391

(22) Filed: Mar. 29, 2002

(51) Int. Cl.[7] ................................................. H04M 3/42
(52) U.S. Cl. .............................. 379/211.02; 379/207.02
(58) Field of Search ........................ 379/211.02, 211.01, 379/207.02, 207.11

(56) References Cited

U.S. PATENT DOCUMENTS 5,428,663 A * 6/1995 Grimes et al. ................ 379/57
5,615,253 A * 3/1997 Kocan et al. ............... 379/210
6,442,259 B2 * 8/2002 Culli et al. ............ 379/211.02

OTHER PUBLICATIONS

U.S. patent Ser. No. 10/109,783, filed Mar. 29, 2002, entitled "Caller Control of Call Waiting Services", Inventors: Silver et al.

* cited by examiner

Primary Examiner—Creighton Smith
(74) Attorney, Agent, or Firm—Merchant & Gould PC

(57) ABSTRACT

A method and system are provided for allowing caller control of calls directed to a called party where the called party has forwarded incoming calls. A call forwarding control feature is selected at the local telephone switch of the calling party on a call-by-call basis. Alternatively, the call forwarding control feature may be provisioned at the switch for all outgoing calls. After a directory number of a called party is entered, a determination is made as to whether the called party has call forwarding service and whether the called party as activated call forwarding for incoming calls. If the called party has activated a call forwarding service for incoming calls, the caller's switch is instructed to terminate the call attempt. A message may be played to the caller to alert the caller that the call attempt is being terminated. If the called party's calls are not forwarded, the caller's call is connected to the called party. The call forwarding control method and system may be switch-based where the determination as to the call forwarding status of the called party's line is made at the called party's switch. Alternatively, the call forwarding control method and system may be network-based where the determination as to whether the called party's calls are forwarded is performed at a network component such as a service control point that is tasked with forwarding calls directed to the called party.

24 Claims, 3 Drawing Sheets

CALLER CONTROL OF CALL FORWARDING SERVICES

FIELD OF THE INVENTION

This invention relates to a method and system for allowing a caller to control calls placed to a called party where the called party has forwarded incoming calls to a forwarding number.

BACKGROUND OF THE INVENTION

A growing number of call processing features are available to users of telecommunications systems. For example, features such as call forwarding, call waiting, voice messaging, and caller identification provide subscribers with desired information and allow subscribers to exercise some control over outgoing and incoming telephone calls. Call forwarding is a feature that allows a subscriber to direct an incoming call to a different telephone directory number. Variations on call forwarding include call forwarding only when the called line is busy, call forwarding only if the called line does not answer, and call forwarding of all incoming calls. For example, if a subscriber knows that she will be working at an office or location remote from the location of her primary telephone directory number, she may forward incoming calls to a telephone directory number of a telephone located in the office in which she will be working. Accordingly, incoming calls to the subscriber's primary telephone directory number are forwarded to the forwarding-number so that the subscriber may receive her calls.

Under such call forwarding systems, a calling party placing a call to a telephone directory number from which calls have been forwarded to a separate telephone directory number has no control over the forwarding process. That is, if a caller calls a telephone directory number from which calls have been forwarded to a forwarding number, the calling party has no knowledge of the forwarding process, and the calling party's call is simply forwarded to the alternate number according to the forwarding instructions of the called party. Often, a calling party would rather not have her calls directed to a forwarding number. For example, the calling party may not wish to be forwarded to a wireless telephone of the called party because the calling party may wish to discuss confidential matters that should not be discussed over a wireless telecommunications system. Likewise, a calling party may not wish to have her call forwarded to a location where no privacy is afforded to the called party. Or, the calling party simply may wish to engage in a brief social conversation that can wait until the called party has returned to the called party's office or home where the called party's primary telephone directory number may be answered.

There is a need in the art for a method and system for allowing a calling party to exercise control over calls placed to a telephone directory number from which incoming numbers have been forwarded to a forwarding number. It is with respect to these and other considerations that the present invention has been made.

SUMMARY OF THE INVENTION

In accordance with the present invention, the above and other problems are solved by a method and system for allowing caller control of calls directed to a called party where the called party has forwarded incoming calls to a forwarding telephone directory number. A call forwarding control feature is selected at the local telephone switch of the calling party on a call-by-call basis. Alternatively, the call forwarding control feature may be provisioned at the switch for all outgoing calls. After a directory number of a called party is entered, a determination is made as to whether the called party has forwarded-incoming calls. If the called party has activated a call forwarding service for incoming calls, the caller's switch is instructed to terminate the call attempt. If the call attempt is to be terminated, a message may be played to the caller to alert the caller that the called party's calls are forwarded and that the call attempt is being terminated. If the called party's calls are not forwarded, the caller's call is connected to the called party.

According to one aspect of the present invention, the call forwarding control method and system are switch-based where the determination as to the call forwarding status of the called party's line is made at the called party's switch. According to another aspect, the call forwarding control method and system are network-based. According to the network-based method and system, the determination as to whether the called party's calls are forwarded is performed at a network component such as a service control point that is tasked with forwarding calls directed to the called party.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION OF THE PREFERRED EMBODIMENT

The following description of an exemplary embodiment of the present invention as made with reference to the above-described drawings wherein like numerals refer to like parts or components throughout the several figures. The present invention is directed to a method and system for allowing caller control of calls directed to a called party where the called party has forwarded incoming calls to a forwarding telephone directory number.

Exemplary Operating Environment

Figure 1:
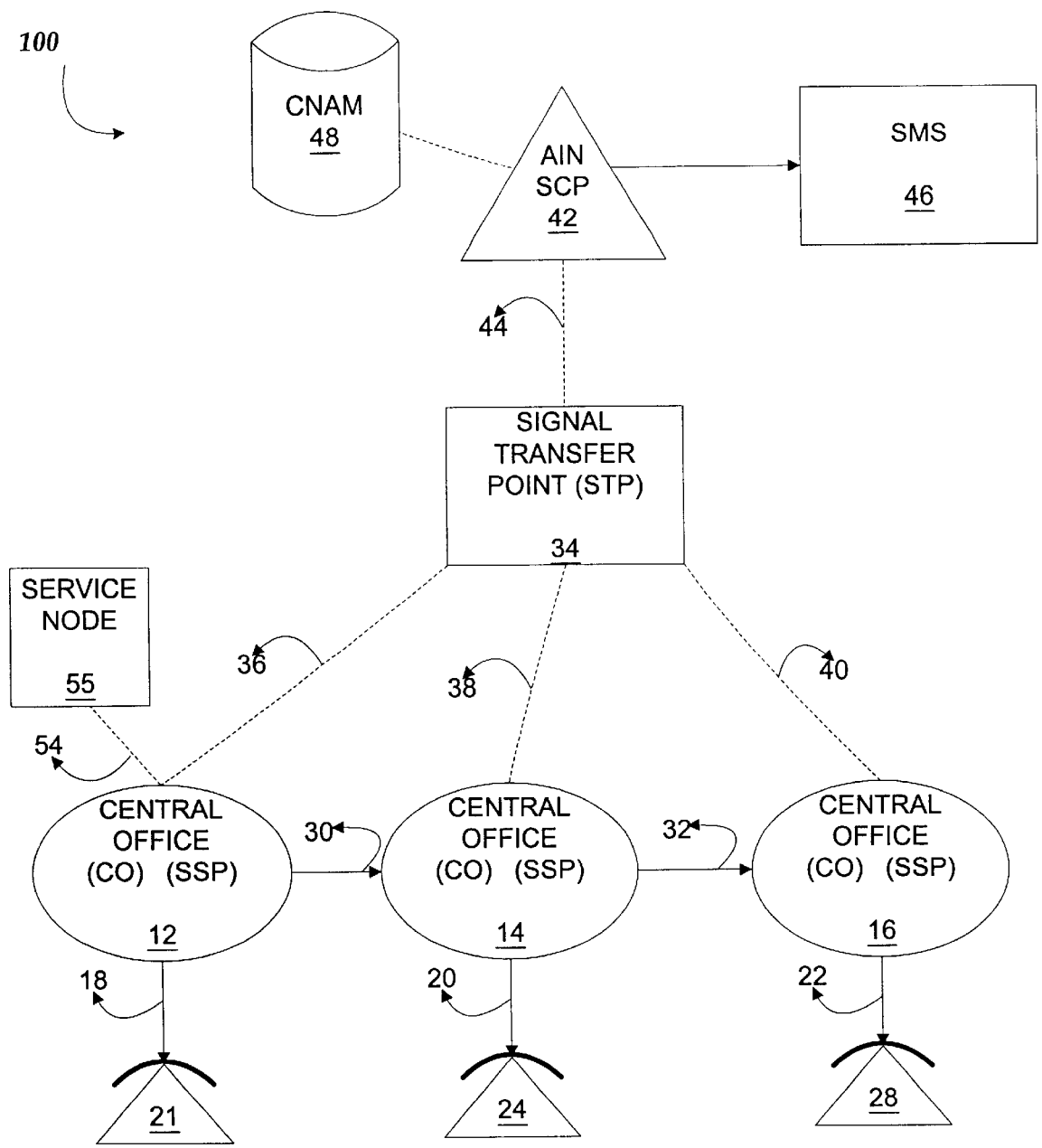
FIG. 1 is a block diagram illustrating components of a telecommunications network that provides an exemplary operating environment for the present invention.

It is advantageous to describe an exemplary operating environment in which the present invention may operate. FIG. 1 is a block diagram illustrating an exemplary operating environment for an embodiment of the present invention and includes a general description of a modern public switched telephone network through which the present invention preferably operates. The modern public switched telephone network (PSTN) has separate signaling paths for voice signals (or other customer-utilized communication circuits) and for control signals, which include information transmitted throughout the network to control the connection and disconnection of the voice circuits.

The public switched telephone network that evolved in the 1980s also incorporated the advanced intelligent network (AIN). Some of the components of the advanced intelligent network are illustrated in FIG. 1. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

Referring still to FIG. 1, a plurality of central offices is provided in a typical public switched telephone network. Each central office may include an electronic switch known to those skilled in the art as a service switching point (SSP). These are indicated in FIG. 1 as SSP switches 12, 14, and 16. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30 and 32.

Central offices switches (SSP) 12, 14, and 16 have a plurality of subscriber lines 18, 20, and 22 connected thereto. Each of the subscriber lines 18, 20, and 22 is connected to a terminating piece or pieces of customer premises equipment that are represented by telephone sets 21, 24 and 28. SSP switches 12, 14, and 16 are connected by a plurality of trunk circuits indicated as 30 and 32 in FIG. 1. These are the voice path trunks that interconnect the central offices 12, 14, and 16 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local service control point (SCP) 42 that is connected to signal transfer point 34 via SS7 data link 44. As is known to those skilled in the art, service control points, such as SCP 42, are physically implemented by relatively powerful fault tolerant computers. Among the functions performed by the service control points is maintenance of network databases used in providing enhanced services. The SCP 42 is also connected to a caller ID with name (CNAM) database 48. The CNAM database comprises a plurality of directory numbers along with associated names for the directory numbers. The CNAM database may be used to provide a lookup database to provide caller ID service.

In operation, the intelligent network elements of the AIN 10, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12, 14, and 16, a relatively small set of triggers are defined at the SSP central office switches for each call.

The message created by an SSP 12 in response to a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP 12 to route the held communication for connection with a terminating station. Query messages, conversation messages, and response messages are standard types of messages defined by the AIN protocol. The details of the AIN protocol are known to those skilled in the art and will not be further described herein. For more information regarding the AIN protocol, see Bellcore Specification GR-1298-CORE Switching Systems Generic Requirements for AIN 0.1, which is incorporated herein by reference.

The modern Advanced Intelligent Network also includes service nodes (SN) such as service node 55 shown in FIG. 1. Those skilled in the art are familiar with service nodes, which are physically implemented by the same types of computers that embody the SCP 42. In addition to the computing capability and data base maintenance features, service nodes 55 use ISDN lines and may include DTMF signal recognition devices, tone generation devices, text to speech (TTS) voice synthesis devices and other voice or data resources. As shown in FIG. 1, the connection is through the SSP. For example SN 55 is connected to SCP 42 via ISDN links 54 to SSP 12, ISDN/SS7 protocol conversion in SSP 12, and SS7 links 36 and 44. It is understood that the service node 55 may also be connected to a service management system 46, but such connection is not shown in FIG. 1. Service nodes 55 are used principally when some custom feature or service is needed that requires an audio connection to the call or transfer of a significant amount of data to a subscriber over a switched connection during or following a call.

Operation of an Exemplary Embodiment

Figure 2:
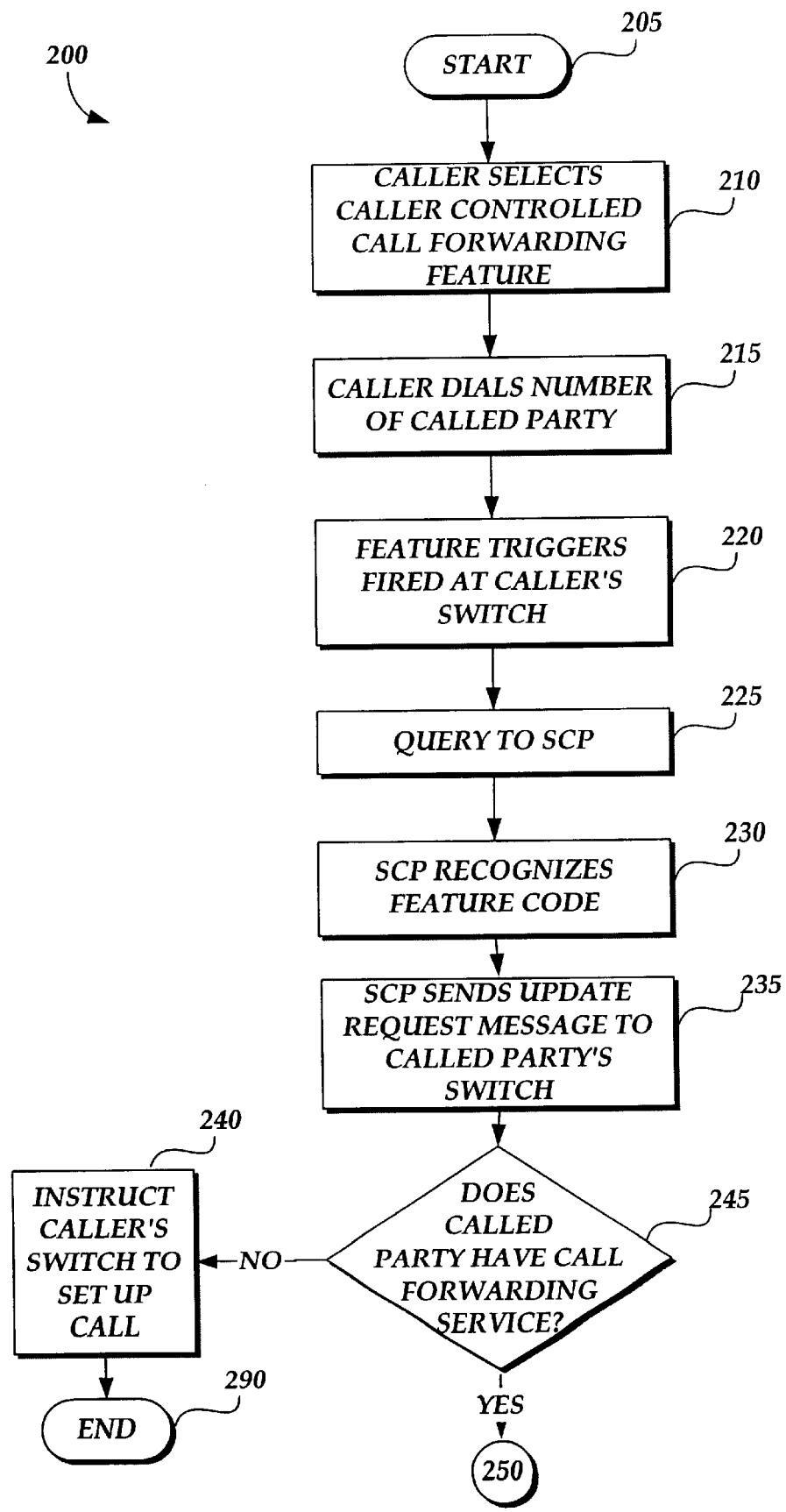
FIGS. 2 and 3 illustrate an operational flow of the steps performed by a method and system of the present invention in allowing a caller to control calls placed to a telephone directory number from which incoming calls have been forwarded to a forwarding number.
Figure 3:
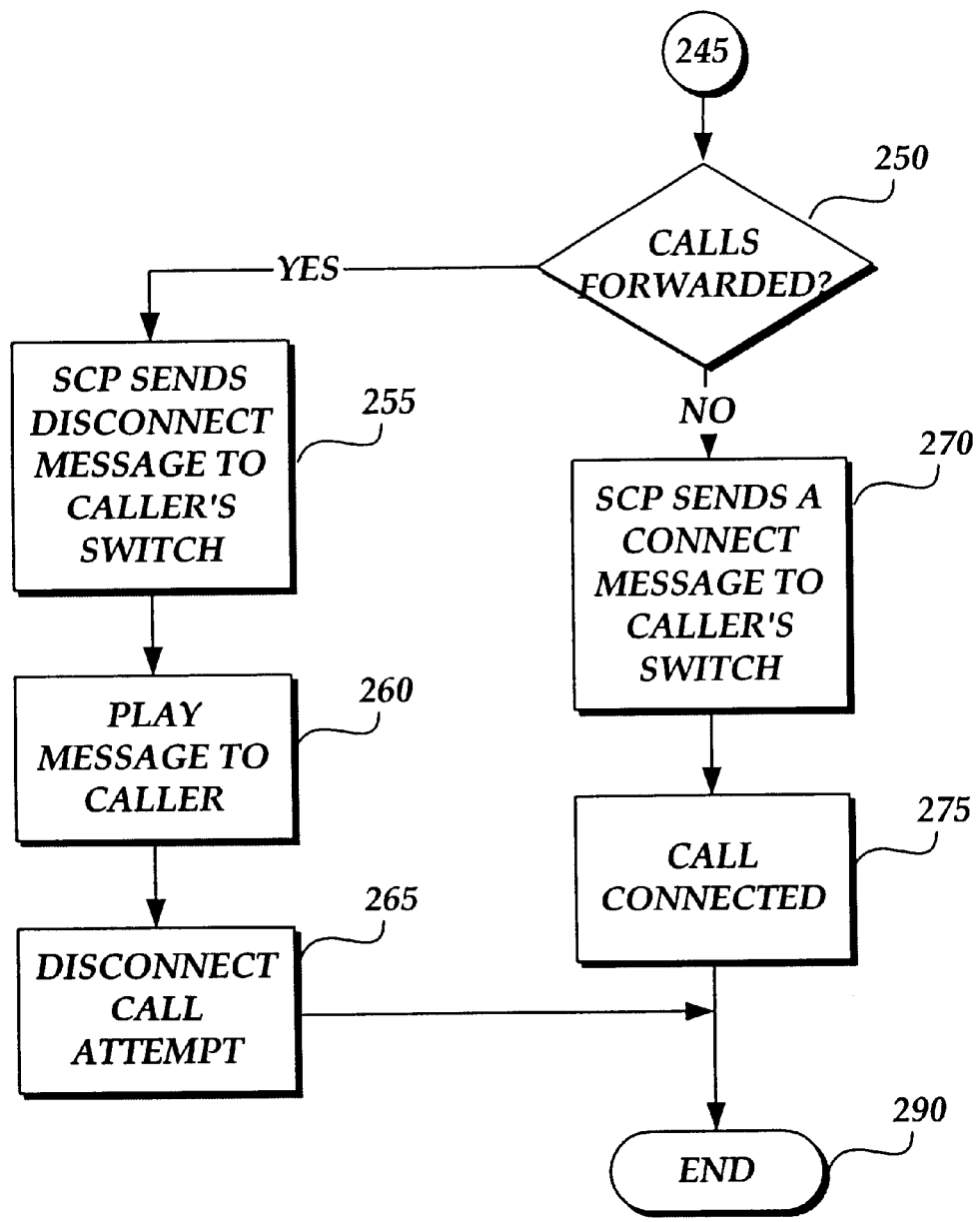

Having described an exemplary operating environment of the present invention with reference to FIG. 1, FIGS. 2 and 3 illustrate an operational flow of the steps performed by a method and system of the present invention in allowing a caller to control calls placed to a telephone directory number from which incoming calls have been forwarded.

With reference to the following description of FIGS. 2 and 3, assume for example that a called party decides to forward telephone calls from the telephone directory number of the telephone located in her office to the telephone directory number of a telephone located at her home. The method 200 begins at Start step 205 and proceeds to step 210 where the calling party selects a call forwarding control feature. In accordance with a preferred embodiment, the calling party selects the call forwarding control feature by dialing a prescribed code on the telephone keypad of the calling party's telephone 21. For example, a code such as "*26" may be entered by the calling party at the telephone 21 in order to provision the call forwarding control feature at the SSP 12.

Alternatively, if the calling party wishes to activate the call forwarding control feature so that the feature operates at all times, and so that the calling party's calls are never forwarded, the calling party may subscribe to the feature from her telecommunications service provider. In such a case, an off-hook delay trigger may be permanently provisioned at the SSP 12 to activate the call forwarding control feature any time the calling party places a telephone call. According to a preferred embodiment, the call forwarding control feature is activated on a call-by-call basis by entering the feature code, described above. Under this embodiment, the calling party may selectively decide when to utilize the call forwarding control feature of the present invention.

At step 215, the caller dials the telephone directory number of the called party's telephone 24. At step 220, the calling party's switch 12 receives the call forwarding control feature code entered by the calling party and the telephone directory number digits dialed by the calling party. In response to the feature code entered by the calling party, a feature code-trigger is fired at the switch 12, and at step 225, a query is generated to the SCP 42 to process the call in accordance with the feature code and the telephone number digits entered by the calling party.

At step 230, the SCP 42 recognizes the feature code entered by the calling party as the call forwarding control feature code. In response, at step 235, the SCP 42 determines whether call forwarding service is provisioned on the line 20 of the called party. In order to determine whether the called party has call forwarding service, the SCP 42 sends an Update Request message to the called party's SSP. If the called party has subscribed to call forwarding feature, the SSP sends back an Update_Data response including the feature activation status (on/off). If the called party does not subscribe to a call forwarding feature, the SSP sends back an Error message of Failure Cause="Unavailable Resources".

As should be understood, the called party may have subscribed to the call forwarding feature, but the feature may not currently be active on the called party's line. For example, the feature may have been deactivated by the called party at the called party's line by selecting a deactivation code such as "*15" or the like. As is well known to those skilled in the art, a number of codes may be provided to telecommunications services subscribers for activating and de-activating call processing features on a case-by-case or call-by-call basis as desired by the subscriber. Or, the feature may be provisioned on the called party's line, but the feature may not be operating at the time of the calling party's call to the called party.

According to one embodiment, a preferred update status message sent from the SCP 42 to the called party switch 14 to determine the status of the call forwarding service provisioned on the called party line 20 includes the following parameters.

Query_Request message:
UserID=Called Party Telephone Number
ProvideInfo
  RequestGroups=RequestGroup4
    RequestGroup4 {Service4=CallForwardingVariable
      Request4=ActivationStatus}

If the SSP 14 retrieves the data requested in the Query_Request message successfully, the SSP 14 sends a Query_Response Return Result to the SCP 42 including the following parameters.
InfoProvided
  ActivationStateCode=off/on A response of "ActivationStateCode=off" indicates calls are not forwarded, and a response of "ActivationStateCode=on" indicates calls are forwarded. If the SSP 14 cannot respond to the request to retrieve any of the values requested in the ProvideInfo parameter, the SSP 14 sends a Query_Response Return Error to the SCP 42 containing the FailureCause parameter coded to "UnavailableResources". This response occurs when the requested data is invalid (e.g., the requested telephone line 20 does not subscribe to a call forwarding feature). If the SSP returns a Return Error response, this indicates that the called party does not have call forwarding feature. These SSP and SCP messages are specified in the Telcordia document GR-1298 and GR-1299 AINGR: Switching Systems, Issue 4, Sep. 1997, which is incorporated herein by reference.

If the called party does not have call forwarding service, the method proceeds to step 240, and the SCP 42 instructs the calling party's switch 12 to complete the call according to normal call set-up procedures. That is, as is understood by those skilled in the art, the trunk line 30 between the calling party's switch 12 and the called party's switch 14 is opened and the call is connected between the calling party from the telephone 21 to the called party at the telephone 24. The method then ends at step 290.

If the SCP 42 determines that the called party does have call forwarding service, the method proceeds to step 250, illustrated in FIG. 3. Referring now to FIG. 3, at step 250, the determination as to the status of the call forwarding feature is made based on the response from the SSP 14 to the update request message. If the return response from the switch 14 to the SCP 42 indicates that calls directed to telephone directory number of the called party's telephone 24 are forwarded (e.g., ActivationStateCode=on), the method proceeds to step 255, and the SCP 42 sends a disconnect message to the calling party's switch 12. At step 260, according to a preferred embodiment, a switch-based message may be played to the calling party at the calling party's telephone 21 such as "The called party's calls are forwarded. This call attempt is terminated." At step 265, the call attempt is terminated by the switch 12, and the method ends at step 290. Alternatively, the announcement may be provided to the calling party from the service node 55.

If at step 250 a determination is made that calls directed to the called party's telephone 24 are not forwarded, the method proceeds to step 270, and the SCP 42 sends a message to the switch 12 of the calling party to connect the call from the calling party's telephone 21 to the called party's telephone 24, as described above. At step 275 the call is completed, and method ends at step 290. As should be understood by those skilled in the art, completion of the call may result in reaching a busy line, a voice mail service, or an unanswered call.

According to another embodiment, the SCP 42 may monitor the call forwarding status of the line 20 of the called party for a prescribed period of time. According to this embodiment, a preformatted message may be played to the calling party after a determination has been made that the calls directed to the called party are forwarded. For example, the calling party may be instructed that for a small charge the call forwarding status of the called party's line will be monitored for a prescribed period of time. After the call forwarding status of the called party's line changes such that calls are no longer forwarded from the called party's telephone to a separate telephone, the calling party may be notified of the change in the call forwarding status so that the calling party may place the desired call to the called party. As should be understood by those skilled in the art, a network component such as a service node 55 may be utilized to request input from the calling party such as "press 1 to monitor the call forwarding status of the called party's line, or press 2 to end this call."

According to an alternative embodiment, the call forwarding control method and system described above may be network-based. According to a network-based method and system, the determination as to whether calls directed to the telephone directory number of the called party's telephone 24 are forwarded is made at a network component such as the service control point 42. According to this embodiment, at steps 245 and 250, described above, rather than sending a message from the SCP 42 to the called party's switch 14 to determine the call forwarding status of the called party's line 20, the service control point 42 performs a database search on the dialed digits of the called party's telephone directory number to determine the call forwarding status of the called party's line 20. According to this embodiment, the call forwarding status of a given telephone line 20 is controlled by a network component such as the SCP 42. According to the switch-based method described above with reference to FIGS. 2 and 3, the call forwarding feature is controlled at the called party's switch 14.

As described herein, a method and system are provided for allowing a calling party to exercise control over calls directed to a telephone directory number from which calls have been forwarded to a separate telephone directory number by the called party. It will be apparent to those skilled in the art that various modifications or variations may be made to the present invention without departing from the scope or spirit of the invention. Other embodiments of the invention will be apparent to those skilled in the art from consideration of the specification and practice of the invention disclosed herein.

We claim:

1. A method for controlling calls directed to a telephone number from which incoming calls have been forwarded, comprising the steps of:
    provisioning a call forwarding control feature at a calling party switch;
    entering a telephone directory number of a called party to place a call from a calling party to a called party;
    determining whether a telephone line of the called party is provisioned with a call forwarding feature;
    determining a status of the call forwarding feature; and
    if the call forwarding feature is activated on the telephone line of the called party, sending a call attempt termination instructions from a service control point to the calling party switch and terminating a call attempt from the calling party to the called party.

2. The method of claim 1, wherein the step of terminating the call attempt from the calling party to the called party is performed if calls directed to the telephone directory number of the called party are forwarded to a second telephone directory number.

3. The method of claim 1, further comprising the step of:
    playing a message to the calling party to notify the calling party that calls directed to the telephone directory number of the called party are forwarded to a second telephone directory number and that the call attempt from the calling party to the called party is terminated.

4. The method of claim 1, further comprising the steps of:
    monitoring at the service control point the status of the call forwarding feature; and
    notifying the calling party via the calling party switch when the status of the call forwarding feature is changed such that calls directed to telephone directory number of the called party are not forwarded to a second telephone directory number.

5. The method of claim 1, further comprising the step of:
    if the call forwarding feature is not activated on the telephone line of the called party, connecting the call from the calling party to the called party.

6. The method of claim 5, prior to the step of connecting the call from the calling party to the called party, further comprising the step of:
    sending a message from the service control point to the calling party switch to connect the call from the calling party to the called party.

7. The method of claim 1, wherein the step of provisioning a call forwarding control feature at a calling party switch includes:
    entering a call forwarding control feature code at the calling party switch.

8. The method of claim 1, wherein the step of determining whether a telephone line of the called party is provisioned with a call forwarding feature, further comprises the steps of:
    querying the service control point to initiate the call forwarding control feature;
    at the service control point, determining whether the telephone line of the called party is provisioned with a call forwarding feature based on the telephone directory number of the called party; and
    sending a call forwarding feature update request from the service control point to the called party switch.

9. The method of claim 8, further comprising the step of:
    sending a status update response from the called party switch to the service control point indicating the status of the call forwarding feature.

10. The method of claim 9, wherein sending a call forwarding feature update request from a service control point to the called party switch includes sending a Query_Request message having a format of:
    UserID=Called Party Telephone Number
    ProvideInfo
        RequestGroups=RequestGroup4
            RequestGroup4 {Service4=CallForwardingVariable
                Request4=ActivationStatus}.

11. The method of claim 10, wherein sending a status update response from the called party switch to the service control point indicating the status of the call forwarding feature includes sending a response message having a format of:
    InfoProvided
        ActivationStateCode=off/on;
    whereby a response result of ActivationStateCode=on indicates calls directed to the telephone directory number of the called party are forwarded; and
    whereby a response result of ActivationStateCode=off indicates calls directed to the telephone directory number of the called party are not forwarded.

12. The method of claim 11, wherein sending a status update response from the called party switch to the service control point indicating the status of the call forwarding feature includes sending a response message having a format of:

FalureCause=Unavailable Resources, indicating that the call forwarding feature is not subscribed to by the called party.

13. The method of claim 1, wherein the step of determining a status of the call forwarding feature further comprises:

querying the service control point to determine the status of the call forwarding feature.

14. The method of claim 13, further comprising the step of:

at the service control point, determining whether calls directed to the telephone directory number of the called party are forwarded to a second telephone directory number.

15. A system for controlling calls directed to a telephone number from which incoming calls have been forwarded, comprising:

a calling party switch operative
to receive provisioning of a call forwarding control feature;
to receive a telephone directory number of a called party to place a call from a calling party to a called party;
to generate a query to a service control point to initiate the call forwarding control feature;

the service control point operative
to determine whether a telephone line of the called party is provisioned with a call forwarding feature;
to determine a status of the call forwarding feature; and
to terminate a call attempt from the calling party to the called party if the call forwarding feature is activated on the telephone line of the called party.

16. The system of claim 15, wherein the service control point is further operative to send a call attempt termination instruction to the calling party switch if the call attempt is to be terminated.

17. The system of claim 15, wherein the calling party switch is further operative:

to play a message to the calling party to notify the calling party that calls directed to the telephone directory number of the called party are forwarded to a second telephone directory number and that the call attempt from the calling party to the called party is terminated.

18. The system of claim 15, wherein the service control point is further operative:

to monitor the status of the call forwarding feature; and
to cause the calling party switch to notify the calling party when the status of the call forwarding feature is changed such that calls directed to telephone directory number of the called party are not forwarded to a second telephone directory number.

19. The system of claim 15, wherein the calling party switch is further operative:

to receive instructions from the service control point to complete the call; and
to connect the call from the calling party to the called party if the call forwarding feature is not activated on the telephone line of the called party.

20. The system of claim 15, wherein the service control point is further operative:

to send a call forwarding feature update request to the called party switch to determine the status of the call forwarding feature; and the called party switch is operative:
to send a status update response from to the service control point indicating the status of the call forwarding feature.

21. The system of claim 20, wherein the update request includes a Query_Request message includes a format of:

UserID=Called Party Telephone Number
ProvideInfo
   RequestGroups=RequestGroup4
      RequestGroup4 {Service4=CallForwardingVariable
         Request4=ActivationStatus}.

22. The system of claim 21, wherein the status update response includes a format of:

InfoProvided
   ActivationStateCode=off/on;

whereby a response result of ActivationStateCode=on indicates calls directed to the telephone directory number of the called party are forwarded; and whereby a response result of ActivationStateCode=off indicates calls.

23. A method for controlling calls directed to a telephone number from which incoming calls have been forwarded, comprising the steps of:

receiving a call forwarding control feature code at the calling party switch;

responsive to receiving the call forwarding control feature code, provisioning a call forwarding control feature at the calling party switch;

entering a telephone directory number of a called party to place a call from a calling party to a called party;

determining whether a telephone line of the called party is provisioned with a call forwarding feature;

determining a status of the call forwarding feature; and if the call forwarding feature is activated on the telephone line of the called party, terminating a call attempt from the calling party to the called party.

24. The method of claim 23, wherein the call forwarding control feature code is received on a call by call basis.

* * * * *

UNITED STATES PATENT AND TRADEMARK OFFICE
CERTIFICATE OF CORRECTION

PATENT NO.    : 6,754,325 B1
DATED         : June 22, 2004
INVENTOR(S)   : Silver et al.

Page 1 of 1

It is certified that error appears in the above-identified patent and that said Letters Patent is hereby corrected as shown below:

<u>Title page</u>,
Item [57], ABSTRACT,
Lines 9 and 10, "and whether the called party as activated" should read -- and whether the called party has activated --

<u>Column 6</u>,
Line 13, "ProvideInfo parameter," should read -- ProvideInfo parameter, --

<u>Column 7</u>,
Line 56, "instructions from" should read -- instruction from --

<u>Column 9</u>,
Line 36, "further operative" should read -- further operative: --

<u>Column 10</u>,
Line 14, "response from to the service" should read -- response to the service --

Signed and Sealed this

Nineteenth Day of October, 2004

JON W. DUDAS
*Director of the United States Patent and Trademark Office*